United States Patent
Li et al.

(10) Patent No.: US 8,856,842 B2
(45) Date of Patent: Oct. 7, 2014

(54) WIRELESS VIDEO CLOCK SYNCHRONIZATION TO ENABLE POWER SAVING

(71) Applicants: Guoqing C. Li, Portland, OR (US); Etan Shirron, Hod-Hasharon (IL); Yaniv Frishman, Kiryat Ono (IL); George R. Hayek, El Dorado Hills, CA (US)

(72) Inventors: Guoqing C. Li, Portland, OR (US); Etan Shirron, Hod-Hasharon (IL); Yaniv Frishman, Kiryat Ono (IL); George R. Hayek, El Dorado Hills, CA (US)

(73) Assignee: Intel Corporation, San Jose, CA (US)

( * ) Notice: Subject to any disclaimer, the term of this patent is extended or adjusted under 35 U.S.C. 154(b) by 0 days.

(21) Appl. No.: 13/706,685

(22) Filed: Dec. 6, 2012

(65) Prior Publication Data

US 2013/0179929 A1    Jul. 11, 2013

Related U.S. Application Data

(60) Provisional application No. 61/585,047, filed on Jan. 10, 2012.

(51) Int. Cl.
*H04N 7/18* (2006.01)
*H04N 21/43* (2011.01)
*H04N 21/4363* (2011.01)
*H04N 21/41* (2011.01)

(52) U.S. Cl.
CPC ...... *H04N 21/43637* (2013.01); *H04N 21/4104* (2013.01); *H04N 21/4305* (2013.01)

USPC .............................................. 725/81; 725/62

(58) Field of Classification Search
None
See application file for complete search history.

(56) References Cited

U.S. PATENT DOCUMENTS

| | | | |
|---|---|---|---|
| 8,363,596 B2 * | 1/2013 | Wang et al. | 370/328 |
| 2009/0296618 A1 | 12/2009 | Wang et al. | |
| 2010/0208636 A1 | 8/2010 | Kim et al. | |
| 2010/0317374 A1 | 12/2010 | Alpert et al. | |
| 2011/0064012 A1 * | 3/2011 | Abhishek et al. | 370/311 |

FOREIGN PATENT DOCUMENTS

KR  10-2011-0123445 A  11/2011
WO  2013/106325 A1  7/2013

OTHER PUBLICATIONS

International Search Report and Written Opinion received for International Application No. PCT/US2013/020672, mailed on Apr. 29, 2013, 10 pages.

* cited by examiner

*Primary Examiner* — Cai Chen
(74) *Attorney, Agent, or Firm* — John F. Travis

(57) ABSTRACT

In a wireless video system, the clock rate for wirelessly transmitting the video data from the transmitting device should be identical to the clock rate for receiving the video data at the receiving device. But the two devices have separate clocks, whose frequencies may drift apart over time, leading the video buffer to be over run or under run. Clock synchronizing messages to prevent this may be sent at short intervals when clock synchronization is first being acquired, and at larger intervals after clock synchronization has already been achieved and is merely being maintained.

24 Claims, 4 Drawing Sheets

| Field: | Version | Type | Subtype | Length | Data (optional) | Clock Mode | Required Timestamp Interval |
|---|---|---|---|---|---|---|---|
| Octets: | 1 | 1 | 1 | 2 | 14 | 1 | 1 |

FIG. 4

WIRELESS VIDEO CLOCK SYNCHRONIZATION TO ENABLE POWER SAVING

CROSS REFERENCE TO RELATED APPLICATIONS

This application is derived from U.S. provisional patent application Ser. No. 61/585,047, filed Jan. 10, 2012, and claims priority to that date for all applicable subject matter.

BACKGROUND

In recent years, products have been manufactured that allow a portable personal computer device (such as a notebook computer, tablet computer, or smart phone) to wirelessly transmit video signals to a video display device (such as a television monitor). Since wireless channels are frequently shared by many devices, wireless communication between two devices is usually irregular rather than continuous. To accommodate this, the device receiving the video data may use a video buffer to store the received data, and clock the data out of the buffer at the rate required by the display. Since the devices are separate, each may use its own internal clock for timing. Although the video is supposed to be clocked at the same predetermined rate in both devices, small amounts of clock drift in one or both devices can eventually cause the video data to be pulled from the buffer faster or slower than the data is being put into it, causing the video buffer to eventually overflow or underflow. This can show up as a discontinuity in the displayed video. Periodically sending resynchronization data can keep the two clocks synchronized, but the current process of doing this frequently enough to rapidly acquire synchronization doesn't allow the computer device much time to stay in a power saving mode, thus giving it shorter battery life.

BRIEF DESCRIPTION OF THE DRAWINGS

Some embodiments of the invention may be better understood by referring to the following description and accompanying drawings that are used to illustrate various embodiments of the invention. In the drawings:

FIG. 4 shows a diagram of a format of a clock operation mode indication packet, according to an embodiment of the invention.

DETAILED DESCRIPTION

Figure 1:
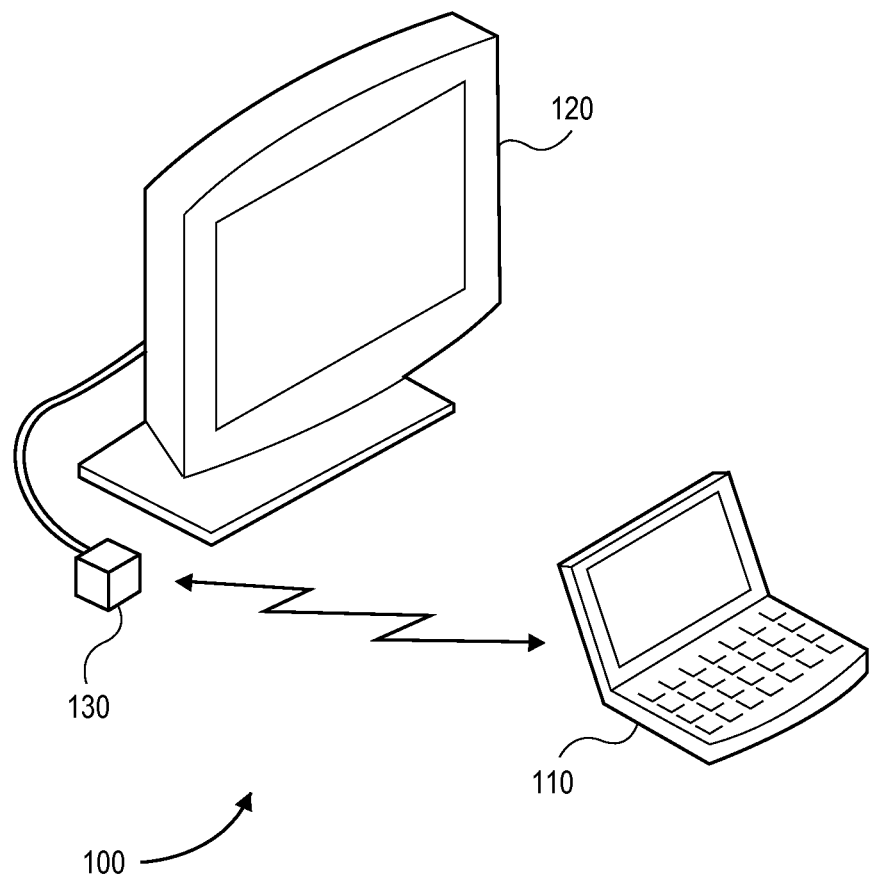
FIG. 1 shows a wireless video network, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Various embodiments of the invention may be implemented fully or partially in software and/or firmware. This software and/or firmware may take the form of instructions contained in or on at least one non-transitory computer-readable medium, which may be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "wireless" may be used to describe circuits, devices, systems, methods, techniques, communications channels, etc., that communicate data by using modulated electromagnetic radiation through a non-solid medium. A wireless device may comprise at least one antenna, at least one radio, at least one memory, and at least one processor, where the radio(s) transmits signals through the antenna that represent data and receives signals through the antenna that represent data, while the processor(s) may process the data to be transmitted and the data that has been received. The processor(s) may also process other data which is neither transmitted nor received.

As used within this document, the term "communicate" is intended to include transmitting and/or receiving. This may be particularly useful in claims when describing the organization of data that is being transmitted by one device and received by another, but only the functionality of either one of those devices is required to infringe the claim. Similarly, the multi-step exchange of data between two devices (each device both transmits and receives during the exchange) may be described as 'communicating', when only the functionality of one of those devices is being claimed.

As used within this document, the term "source device" refers to the device that wirelessly transmits the video data (such as the notebook computer, tablet computer, smart phone, etc.).

As used within this document, the term "sink device" refers to the device that wirelessly receives the video data from the source device, that outputs the received video data to the display, and that contains a video buffer to temporarily store the video data after receiving it and before outputting it. In some embodiments, the sink device may also convert the format of the video data to a form more suitable for the display.

In various embodiments, the source device and the sink device may communicate clock synchronization information with each other in a way that permits them to repeatedly synchronize their clocks. Within this process, 'clock acquisition' refers to using the clock synchronization information to initially synchronize the two clocks, while 'clock tracking' refers to using the synchronization information to keep the two clock synchronized after the initial clock synchronization has already been achieved. Further, this technique may permit the synchronizing information to be communicated less often during clock tracking than during clock acquisition.

This distinction is feasible because the two clocks may be quite far apart in clock speed before clock acquisition is started, and the initial synchronization should take place rapidly to avoid undesirable delays in starting a visually satisfying video display. On the other hand, after initial clock synchronization has been acquired, the two clocks should be very close in clock speed, and any drifting of the clock speed should occur very slowly, if at all. When the synchronization clock information is sent less often, the source device may be able to go into a power-saving inactive mode for longer periods between clock synchronization updates, thus potentially using less power overall.

FIG. 1 shows a wireless video network, according to an embodiment of the invention. In video network 100, source device 110 may wirelessly transmit video data to a sink device 130, for showing on video display 120. Although the video data itself may be communicated in one direction (i.e., from source device to sink device), other data related to the video may involve transmissions in the opposite direction or both directions.

Although a notebook computer is shown as source device 110, the source device may be any suitable portable computer device, such as but not limited to a tablet or a smart phone. Although video display 120 is shown as a video monitor, it may be any suitable display device, such as but not limited to a television, a tablet display, a smart phone display, etc. Although sink device 130 and video device 120 are shown connected to each other through a cable, in some embodiments they may communicate with each other wirelessly. Although sink device 130 is shown as being a separate device from display 120, in some embodiments the sink device may be incorporated into the display device.

Figure 2:
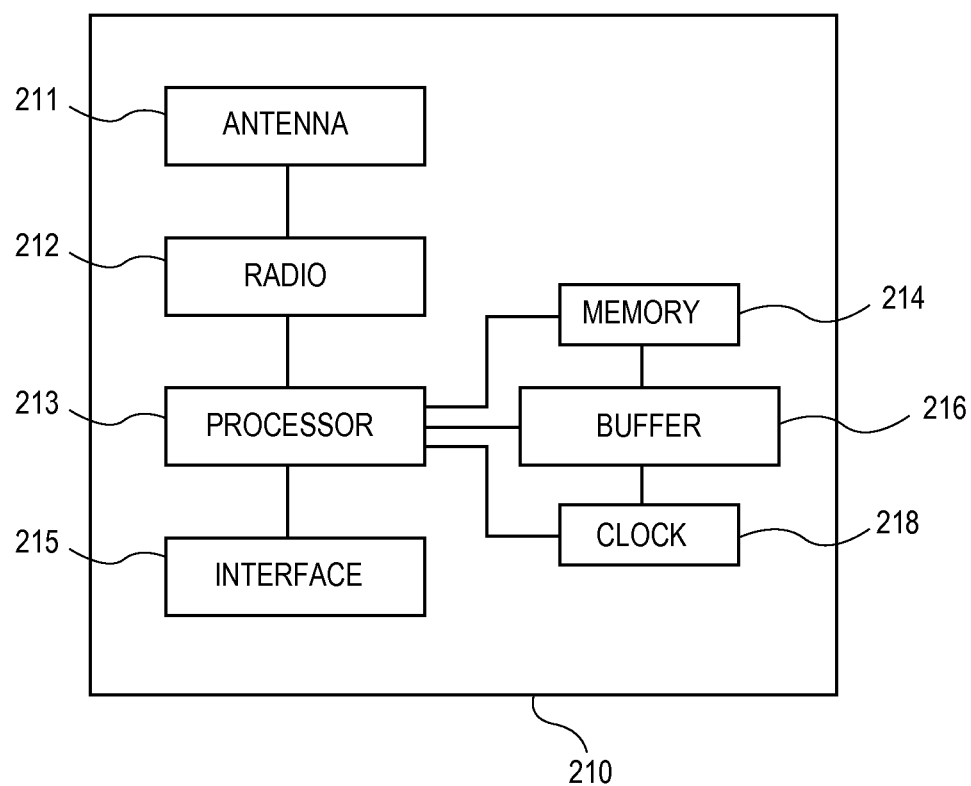
FIG. 2 shows a wireless communications device, according to an embodiment of the invention.

FIG. 2 shows a wireless communications device, according to an embodiment of the invention. Each device 110 and 130 may be such a wireless communications device, which is shown as a generic wireless communications device 210. Device 210 is shown with one or more antennas 211, one or more radios 212, one or more processors 213, one or more memories 214, and one or more interfaces 215. These components may be coupled together in any feasible manner. A video buffer 216 is also shown. This video buffer may be in sink device 130, and may be a first-in first-out (FIFO) buffer that receives the incoming video data from the source device 110, and provides outgoing video data to the display device 120. A clock 218 with an adjustable frequency may be used to clock data into and/or out of the buffer. The video buffer 216 may be separate from the memory 214 (as shown), or it may be implemented as a specific portion of memory 214. In some embodiments, source device 110 may also have a video buffer, to be used for temporarily holding video data before it's transmitted to sink device 130. Although not shown, the buffer 216 may be coupled to a video interface in the sink device to clock outgoing video data destined for the display device, or may be coupled to the radio in the source device to clock the outgoing video data for wireless transmission.

As previously mentioned, for the overall rate of video data transmitted from the source device to be equal to the overall rate of video data consumed by the display device, the data should be clocked into the buffer at the same rate the data is clocked out of the buffer. Clocks for digital logic are typically generated by phase-lock-loop (PLL) circuits, which can be tuned to different frequencies but are subject to frequency drift. Since the source device and sink device have separate clocks, which may drift independently, their clocks should periodically be synchronized with each other.

Figure 3:
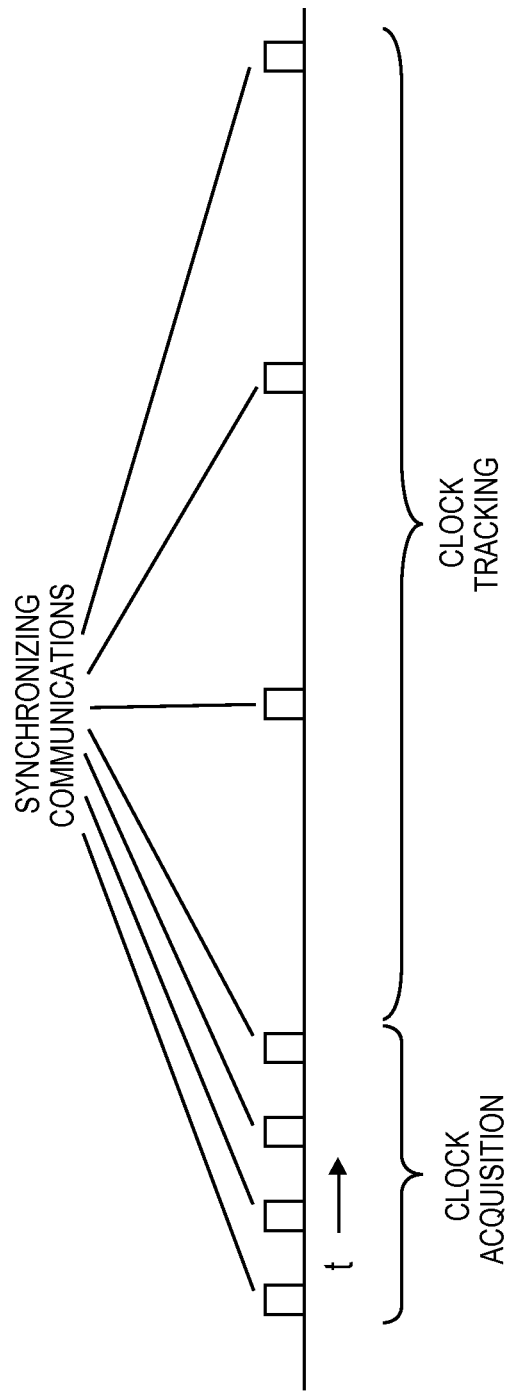
FIG. 3 shows a timing diagram of an exchange of clock synchronization messages, according to an embodiment of the invention.

FIG. 3 shows a timing diagram of an exchange of clock synchronization messages, according to an embodiment of the invention. Each rectangular block along the horizontal time axis may represent one or more wireless packets that contain clock synchronizing information. Each block may represent one or more transmissions, or a sequence of one or more transmission/reception exchanges. Other communications, involving things other than synchronizing information, may also be present but are not shown to avoid cluttering up the drawing. In a preferred embodiment, the clock in the sink device may be used as a reference, and synchronizing information may be transmitted from the sink device to the source device. In another embodiment, the clock in the source device may be used as a reference, and synchronizing information may be transmitted from the source device to the sink device.

As can be seen in FIG. 3, the interval between synchronizing information may vary. In particular, during a clock acquisition mode the intervals may be smaller, but during the clock tracking mode the intervals may be longer. This represents an example of a tradeoff between the two separate goals of acquisition and tracking. When the video link is initially established (i.e., when the two clocks may be fairly far apart in frequency), it may be desirable to acquire synchronization quickly. Since each synchronizing message may cause an incremental lessening of the difference between the two clock frequencies, several such messages may be necessary to achieve identical frequencies. But once synchronization has been achieved, the clock frequencies should drift apart very slowly, if at all, so synchronizing information may be transmitted much less often without exceeding the tolerances of the video system.

The time interval between synchronizing messages may be chosen based on various criteria, such as but not limited to the drift parameters and on what is acceptable to the average user. In one embodiment, a synchronizing message may be sent once per video slice when in the clock acquisition mode, and be sent once every multiple video slices when in clock tracking mode. A video slice may contain a predetermined number of pixels. For example, a video slice may contain an integer number of macroblocks, where a macroblock is a 16 by 16 block of pixels. These numbers are for example only, and should not be read as a limitation on the specific size of a video slice.

Various formats may be used to convey the actual synchronizing information. In one embodiment, this may be in the form of a timestamp counter value included in a Program Clock Reference (PCR) in a transmitted packet. The device receiving this timestamp value may compare this value with its own counter value, and adjust its own clock speed up or down depending on the direction and amount of the difference between the two values.

FIG. 4 shows a diagram of a format of a clock operation mode indication packet, according to an embodiment of the invention. Although the overall format may be used in other types of packets, the Type and Subtype fields may be used to indicate this new type of packet. For example, a packet Type value of 2 and a packet Subtype value of C (in hexadecimal notation) might be used to indicate this particular type of packet, although these particular values should not be seen as a limitation on the various embodiments of the invention. The Data field may be used when video data is included in the packet. Alternately, the Data field may be omitted if no such video data is included. The Clock Mode field may be used to indicate whether the sink clock is operating in clock acquisition mode or clock tracking mode (for example, a value of 0 may indicate acquisition and a value of 1 may indicate tracking, or vice versa). In some embodiments, a Required Timestamp Interval field may be used to indicate what the interval between clock synchronization messages will be in the clock tracking mode. In some embodiments, the Clock Mode field and Required Timestamp Interval field may be included in what is labeled the Payload field in other types of packets with a similar construction. In those other types of packets, the Payload field may be variable. This, and the optional nature of the Data field, may cause the overall length of the packet to be variable, so the Length field may be used to define the length of the packet.

The packet of FIG. 4 may be sent to indicate a clock mode transition. For example, it may be sent to indicate that clock synchronization has been acquired and the devices should switch to clock tracking mode. It may also be used to indicate that the initial clock acquisition mode is to start. It may also be sent periodically for other reasons, such as to insure that both devices are still in the same clock synchronization mode.

Because both the video data and the synchronizing information may be transmitted in bursts at predetermined intervals, under some circumstances the source device may be able to go into a power saving mode between bursts. During clock acquisition mode the intervals may be comparatively shorter because the synchronizing information is transmitted more often. But during clock tracking mode, the intervals may be longer, allowing the source device to stay in the power saving mode for longer periods of time, thereby reducing overall battery drain.

The foregoing description is intended to be illustrative and not limiting. Variations will occur to those of skill in the art. Those variations are intended to be included in the various embodiments of the invention, which are limited only by the scope of the following claims.

What is claimed is:

1. A first device for communicating video data wirelessly to a second device, the first device comprising:
   a processor, a memory, and a radio coupled to the processor and the memory;
   wherein the radio is to wirelessly communicate video data between the first and second devices;
   wherein the radio is to receive clock synchronization information from the second device to synchronize a first video clock in the first device with a second video clock in the second device; and
   wherein the clock synchronization information is to be received at intervals of a first duration during a first mode and at intervals of a second duration during a second mode, the second duration being longer than the first duration;
   wherein the first duration is used for clock acquisition to acquire synchronization between the first video clock and the second video clock, and the second duration is used for clock tracking to maintain synchronization between the first video clock and the second video clock;
   wherein the first clock and the second clock are used to communicate video information between the first device and the second device;
   wherein the first clock is used to communicate video data into or out of a buffer.

2. The first device of claim 1, wherein the second duration is an integer multiple of the first duration.

3. The first device of claim 1, wherein the radio is to receive a packet from the second device indicating whether the first device is to operate in the first mode or the second mode.

4. The first device of claim 1, wherein the first mode is a clock acquisition mode and the second mode is a clock tracking mode.

5. A method for synchronizing a video clock in a first device with a video clock in a second device, comprising:
   wirelessly communicating video data between the first and second devices; and
   receiving clock synchronization information from the second device to synchronize the video clock in the first device with the video clock in the second device;
   wherein said receiving the clock synchronization information occurs at intervals of a first duration during a first mode and at intervals of a second duration during a second mode, the second duration being longer than the first duration;
   wherein the first duration is used for clock acquisition to acquire synchronization between the first video clock and the second video clock, and the second duration is used for clock tracking to maintain synchronization between the first video clock and the second video clock.

6. The method of claim 5, wherein the second duration is an integer multiple of the first duration.

7. The method of claim 5, further comprising receiving a packet from the second device indicating whether the first device is to operate in the first mode or the second mode.

8. The method of claim 5, wherein the first mode is a clock acquisition mode and the second mode is a clock tracking mode.

9. At least one computer-readable non-transitory storage medium that contains instructions, which when executed by one or more processors result in performing operations comprising:
   wirelessly communicating video data between a first device and a second device; and
   receiving clock synchronization information from the second device to synchronize a video clock in the first device with a video clock in the second device;
   wherein said receiving the clock synchronization information occurs at intervals of a first duration during a first mode and at intervals of a second duration during a second mode, the second duration being longer than the first duration;
   wherein the first duration is used for clock acquisition to acquire synchronization between the first video clock and the second video clock, and the second duration is used for clock tracking to maintain synchronization between the first video clock and the second video clock.

10. The medium of claim 9, wherein the second duration is an integer multiple of the first duration.

11. The medium of claim 9, wherein the operations further comprise receiving a packet from the second device indicating whether the first device is to operate in the first mode or the second mode.

12. The medium of claim 9, wherein the first mode is a clock acquisition mode and the second mode is a clock tracking mode.

13. A first device for communicating video data wirelessly to a second device, the first device comprising:
   a processor, a memory, and a radio coupled to the processor and the memory;
   wherein the radio is to wirelessly communicate video data with a second device;
   wherein the radio is to transmit clock synchronization information to the second device to synchronize a second clock in the second device with a first clock in the first device; and
   wherein the clock synchronization information is to be transmitted at intervals of a first duration during a first mode and at intervals of a second duration during a second mode, the second duration being longer than the first duration;
   wherein the first duration is used for clock acquisition to acquire synchronization between the first video clock and the second video clock, and the second duration is used for clock tracking to maintain synchronization between the first video clock and the second video clock;
   wherein the first clock is used to communicate video data into or out of a buffer.

14. The first device of claim 13, wherein the second duration is an integer multiple of the first duration.

15. The first device of claim 13, wherein the radio is to transmit a packet to the second device indicating whether the second device is to operate in the first mode or the second mode.

16. The first device of claim 13, wherein the first mode is a clock acquisition mode and the second mode is a clock tracking mode.

17. A method of synchronizing a video clock in a first device with a video clock in a second device, comprising:
   wirelessly communicating video data between the first and second devices; and
   transmitting clock synchronization information to the second device to synchronize a second clock in the second device with a first clock in the first device;
   wherein said transmitting the clock synchronization information occurs at intervals of a first duration during a first mode and at intervals of a second duration during a second mode, the second duration being longer than the first duration;
   wherein the first duration is used for clock acquisition to acquire synchronization between the first video clock and the second video clock, and the second duration is used for clock tracking to maintain synchronization between the first video clock and the second video clock.

18. The method of claim 17, wherein the second duration is an integer multiple of the first duration.

19. The method of claim 17, further comprising transmitting a packet to the second device indicating whether the second device is to operate in the first mode or the second mode.

20. The method of claim 17, wherein the first mode is a clock acquisition mode and the second mode is a clock tracking mode.

21. At least one computer-readable non-transitory storage medium that contains instructions, which when executed by one or more processors result in performing operations comprising:
   wirelessly communicating video data between the first and second devices; and
   transmitting clock synchronization information to the second device to synchronize a second clock in the second device with a first clock in the first device;
   wherein said transmitting the clock synchronization information occurs at intervals of a first duration during a first mode and at intervals of a second duration during a second mode, the second duration being longer than the first duration;
   wherein the first duration is used for clock acquisition to acquire synchronization between the first video clock and the second video clock, and the second duration is used for clock tracking to maintain synchronization between the first video clock and the second video clock.

22. The medium of claim 21, wherein the second duration is an integer multiple of the first duration.

23. The medium of claim 21, wherein the operations further comprise transmitting a packet to the second device indicating whether the second device is to operate in the first mode or the second mode.

24. The medium of claim 21, wherein the first mode is a clock acquisition mode and the second mode is a clock tracking mode.

* * * * *